(12) United States Patent
Yamamura et al.

(10) Patent No.: US 8,124,002 B2
(45) Date of Patent: Feb. 28, 2012

(54) EXTRUSION-MOLDING MACHINE, EXTRUSION-MOLDING METHOD, AND METHOD FOR MANUFACTURING HONEYCOMB STRUCTURED BODY

(75) Inventors: Norihiko Yamamura, Ibigawacho (JP); Kazuya Naruse, Courtenay (FR); Eiji Sumiya, Ibigawacho (JP); Kosei Tajima, Ibigawacho (JP)

(73) Assignee: Ibiden Co., Ltd., Ogaki-shi (JP)

( * ) Notice: Subject to any disclaimer, the term of this patent is extended or adjusted under 35 U.S.C. 154(b) by 760 days.

(21) Appl. No.: 11/696,976

(22) Filed: Apr. 5, 2007

(65) Prior Publication Data

US 2007/0243283 A1    Oct. 18, 2007

(30) Foreign Application Priority Data

Apr. 13, 2006  (WO) .................. PCT/JP2006/007867

(51) Int. Cl.
*B28B 3/22* (2006.01)
(52) U.S. Cl. ..................... 264/630; 264/631; 425/376.1
(58) Field of Classification Search .................. 264/630, 264/631; 425/376.1
See application file for complete search history.

(56) References Cited

U.S. PATENT DOCUMENTS

| | | | |
|---|---|---|---|
| 2,572,063 A * | 10/1951 | Skipper ........................... | 96/196 |
| 3,501,807 A | 3/1970 | Selbach | |
| 5,914,187 A | 6/1999 | Naruse et al. | |
| 6,634,781 B2 * | 10/2003 | Bowens et al. ................. | 366/79 |
| 6,669,751 B1 | 12/2003 | Ohno et al. | |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |

(Continued)

FOREIGN PATENT DOCUMENTS

EP    0 545 056 A1    6/1993

(Continued)

OTHER PUBLICATIONS

McKee et al. "Simple Laboratory D-Airing Extrusion Apparatus". J. Sci. Instrum. vol. 27, p. 26 (1950).*

(Continued)

*Primary Examiner* — Matthew Daniels
*Assistant Examiner* — Russell Kemmerle, III
(74) *Attorney, Agent, or Firm* — Ditthavong Mori & Steiner, P.C.

(57) ABSTRACT

An extrusion-molding machine according to the present invention comprises: a screw having a blade portion for extruding a molding material, the screw disposed in a tightly-closed space; and a die for molding an extruded molding material, wherein the space is maintained in a reduced-pressure atmosphere, and a high-hardness coat layer is formed at least on the blade portion.

11 Claims, 7 Drawing Sheets

U.S. PATENT DOCUMENTS

| | | | |
|---|---|---|---|
| 2002/0036948 | A1 | 3/2002 | Yamaguchi et al. |
| 2002/0131328 | A1 | 9/2002 | Bowens et al. |
| 2003/0098530 | A1 | 5/2003 | Inoguchi |
| 2004/0062828 | A1 | 4/2004 | Yamaguchi et al. |
| 2004/0161596 | A1 | 8/2004 | Taoka et al. |
| 2005/0109023 | A1 | 5/2005 | Kudo et al. |
| 2005/0153099 | A1 | 7/2005 | Yamada |
| 2005/0169819 | A1 | 8/2005 | Shibata |
| 2005/0175514 | A1 | 8/2005 | Ohno |
| 2005/0180898 | A1 | 8/2005 | Yamada |
| 2005/0247038 | A1 | 11/2005 | Takahashi |
| 2005/0272602 | A1 | 12/2005 | Ninomiya |
| 2006/0029898 | A1 | 2/2006 | Saijo et al. |
| 2006/0043652 | A1 | 3/2006 | Saijo et al. |
| 2006/0051556 | A1 | 3/2006 | Ohno et al. |
| 2006/0073970 | A1 | 4/2006 | Yamada |
| 2006/0108347 | A1 | 5/2006 | Koyama et al. |
| 2006/0118546 | A1 | 6/2006 | Saijo |
| 2006/0166820 | A1 | 7/2006 | Ogyu et al. |
| 2006/0210765 | A1 | 9/2006 | Ohno et al. |
| 2006/0216466 | A1 | 9/2006 | Yoshida |
| 2006/0216467 | A1 | 9/2006 | Yoshida |
| 2006/0222812 | A1 | 10/2006 | Koyama et al. |
| 2006/0225390 | A1 | 10/2006 | Yoshida |
| 2006/0230732 | A1 | 10/2006 | Kunieda |
| 2006/0245465 | A1 | 11/2006 | Saijo et al. |
| 2006/0269722 | A1 | 11/2006 | Yamada |
| 2007/0020155 | A1 | 1/2007 | Ohno et al. |
| 2007/0028575 | A1 | 2/2007 | Ohno et al. |
| 2007/0044444 | A1 | 3/2007 | Oshimi |
| 2007/0068128 | A1 | 3/2007 | Oshimi et al. |
| 2007/0085233 | A1 | 4/2007 | Yamada |
| 2007/0116908 | A1 | 5/2007 | Ohno et al. |
| 2007/0126160 | A1 | 6/2007 | Takahashi |
| 2007/0128405 | A1 | 6/2007 | Sakaguchi et al. |
| 2007/0130897 | A1 | 6/2007 | Sakaguchi et al. |
| 2007/0144561 | A1 | 6/2007 | Saijo et al. |
| 2007/0148403 | A1 | 6/2007 | Yamamura et al. |
| 2007/0152382 | A1 | 7/2007 | Yamada et al. |
| 2007/0169453 | A1 | 7/2007 | Hayakawa |
| 2007/0175060 | A1 | 8/2007 | Idei et al. |
| 2007/0178275 | A1 | 8/2007 | Takahashi |
| 2007/0187651 | A1 | 8/2007 | Naruse et al. |
| 2007/0190350 | A1 | 8/2007 | Ohno et al. |
| 2007/0196620 | A1 | 8/2007 | Ohno et al. |
| 2007/0199205 | A1 | 8/2007 | Hoshino et al. |
| 2007/0199643 | A1 | 8/2007 | Kawai et al. |
| 2007/0202455 | A1 | 8/2007 | Saijo et al. |
| 2007/0204580 | A1 | 9/2007 | Kunieda |
| 2007/0212517 | A1 | 9/2007 | Ohno et al. |
| 2007/0235895 | A1 | 10/2007 | Yamamura et al. |
| 2007/0243283 | A1 | 10/2007 | Yamamura et al. |
| 2007/0262497 | A1 | 11/2007 | Yamamura et al. |
| 2007/0262498 | A1 | 11/2007 | Saijo et al. |
| 2007/0277655 | A1 | 12/2007 | Kawai et al. |
| 2007/0293392 | A1 | 12/2007 | Ohno et al. |
| 2008/0006971 | A1 | 1/2008 | Kawai et al. |
| 2008/0067725 | A1 | 3/2008 | Naruse et al. |
| 2008/0084010 | A1 | 4/2008 | Naruse et al. |
| 2008/0088072 | A1 | 4/2008 | Kobayashi |
| 2008/0106008 | A1 | 5/2008 | Kasai et al. |
| 2008/0106009 | A1 | 5/2008 | Naruse et al. |
| 2008/0111274 | A1 | 5/2008 | Kawai et al. |
| 2008/0115597 | A1 | 5/2008 | Ohno et al. |
| 2008/0116200 | A1 | 5/2008 | Kawai et al. |
| 2008/0116601 | A1 | 5/2008 | Naruse et al. |
| 2008/0120950 | A1 | 5/2008 | Ohno et al. |
| 2008/0136053 | A1 | 6/2008 | Kuribayashi et al. |
| 2008/0136062 | A1 | 6/2008 | Kasai et al. |
| 2008/0138567 | A1 | 6/2008 | Ninomiya et al. |
| 2008/0150200 | A1 | 6/2008 | Tajima |
| 2008/0157445 | A1 | 7/2008 | Kawai et al. |
| 2008/0160249 | A1 | 7/2008 | Makino |
| 2008/0174039 | A1 | 7/2008 | Saijo et al. |
| 2008/0179781 | A1 | 7/2008 | Iwata |
| 2008/0190081 | A1 | 8/2008 | Oshimi |
| 2008/0190083 | A1 | 8/2008 | Oshimi |
| 2008/0197544 | A1 | 8/2008 | Saijo et al. |
| 2008/0213485 | A1 | 9/2008 | Shibata |
| 2008/0236115 | A1 | 10/2008 | Sakashita |
| 2008/0236122 | A1 | 10/2008 | Ito |
| 2008/0236724 | A1 | 10/2008 | Higuchi |
| 2008/0237428 | A1 | 10/2008 | Kobayashi et al. |
| 2008/0237942 | A1 | 10/2008 | Takamatsu |
| 2008/0241015 | A1 | 10/2008 | Kudo et al. |
| 2008/0241444 | A1 | 10/2008 | Oshimi |
| 2008/0241466 | A1 | 10/2008 | Saito et al. |
| 2008/0251977 | A1 | 10/2008 | Naruse et al. |
| 2008/0284067 | A1 | 11/2008 | Naruse et al. |
| 2008/0305259 | A1 | 12/2008 | Saijo |
| 2008/0318001 | A1 | 12/2008 | Sakakibara |
| 2009/0004431 | A1 | 1/2009 | Ninomiya |
| 2009/0107879 | A1 | 4/2009 | Otsuka et al. |
| 2009/0130378 | A1 | 5/2009 | Imaeda et al. |

FOREIGN PATENT DOCUMENTS

| | | |
|---|---|---|
| EP | 1 637 301 A2 | 3/2006 |
| EP | 07-00-3757 | 6/2007 |
| GB | 2171418 | 8/1986 |
| JP | 2-297404 | 12/1990 |
| JP | 6-31711 | 2/1994 |
| JP | 7-204483 | 8/1995 |
| JP | 08-057923 | 3/1996 |
| JP | 9-85739 | 3/1997 |
| JP | 2000-220085 | 8/2000 |
| JP | 2002-37673 | 2/2002 |
| JP | 2002-144313 | 5/2002 |
| JP | 2006-22356 | 1/2006 |

OTHER PUBLICATIONS

European Search Report, 07003757.7, mailed Sep. 11, 2007.

* cited by examiner

A-A line cross-sectional view

EXTRUSION-MOLDING MACHINE, EXTRUSION-MOLDING METHOD, AND METHOD FOR MANUFACTURING HONEYCOMB STRUCTURED BODY

CROSS-REFERENCE TO RELATED APPLICATIONS

This application claims priority of PCT/JP2006/307867 filed on Apr. 13, 2006. The contents of this application are incorporated herein by reference in their entirety.

BACKGROUND OF THE INVENTION

1. Field of the Invention

The present invention relates to an extrusion-molding machine, an extrusion-molding method, and a method for manufacturing a honeycomb structured body.

2. Discussion of the Background

In recent years, particulates such as soot contained in exhaust gases that are discharged from internal combustion engines of vehicles, such as buses and trucks, and construction machines, have raised serious problems as contaminants harmful to the environment and the human body.

Various honeycomb filters using honeycomb structured bodies made from porous ceramic materials, which serve as filters that capture particulates in exhaust gases to purify the exhaust gases, have been proposed.

Conventionally, upon manufacturing a honeycomb structured body, first, ceramic powder serving as material powder and a binder are dry-mixed, and to this is further added a dispersant solution and the like, and mixed so that a wet mixture is prepared. Moreover, the wet mixture is continuously extrusion-molded through a die, and the extruded molded body is cut into a predetermined length so that a pillar-shaped honeycomb molded body is manufactured.

Next, the resulting honeycomb molded body is dried by using a microwave drying apparatus or a hot-air drying apparatus, and after the honeycomb molded body thus dried has been again cut into a precise length, predetermined cells are sealed so as to manufacture a honeycomb molded body in which one of ends of each cell is sealed with a plug material layer. Thereafter, a degreasing process is carried out on the resulting honeycomb molded body, and then a firing process is carried out on the degreased honeycomb molded body placed on a firing jig so that a honeycomb fired body is manufactured.

Next, after attaching a gap holding member to each of the side faces of the honeycomb fired body, a sealing material paste is applied thereon, and a number of honeycomb fired bodies are bonded to one another by interposing sealing material layers (adhesive layers), with the honeycomb fired bodies mutually bonded to one another with an interval formed by the gap holding member, so that an aggregate of the honeycomb fired bodies is manufactured. Next, the resulting aggregate of the honeycomb fired bodies is cut and machined into a predetermined shape, such as a cylindrical shape and a cylindroid shape, by using a cutting tool or the like so as to form a ceramic block, and lastly, a sealing material paste is applied onto the periphery of the ceramic block to form a sealing material layer (coat layer); thus, manufacturing of the honeycomb structured body is completed.

In the above-mentioned manufacturing process, upon manufacturing the honeycomb molded bodies, the resulting molded bodies need to have a uniform composition. For this reason, normally, after dry-mixing the ceramic powder and a binder as described above, the powder mixture and a liquid-state dispersant solution are mixed by using a mixing apparatus, and then again mixed using an extrusion-molding machine provided with a screw, and further extrusion-molded through a die.

SUMMARY OF THE INVENTION

An extrusion-molding machine according to the present invention comprises: a screw having a blade portion for extruding a molding material, the screw disposed in a tightly-closed space; and a die for molding an extruded molding material, wherein the space is maintained in a reduced-pressure atmosphere, and a high-hardness coat layer is formed at least on the blade portion.

In the extrusion-molding machine according to the present invention, desirably, the main component of the high-hardness coat layer comprises tungsten carbide, and the high-hardness coat layer has a surface roughness Ra of about 10 μm or less. Moreover, desirably, the high-hardness coat layer has a porosity of about 0.3% or less, and the maximum dimension of recess portions on the surface of the high-hardness coat layer is at least about 1 μm and at most about 50 μm.

In the case where the main component of the high-hardness coat layer comprises tungsten carbide as described above, desirably, nickel is used as a binder used for forming the high-hardness coat layer.

Moreover, the high-hardness coat layer desirably has a thickness of at least about 300 μm and at most about 1200 μm, and desirably has a Vickers hardness of about 2000 HV or more.

In the extrusion-molding machine according to the present invention, desirably, the space has an inner pressure that is lower than the atmospheric pressure by at least about 50 kPa and at most about 100 kPa.

Desirably, the extrusion-molding machine according to the present invention comprises a plurality of the screws; and the same number of the dies as the screws, wherein, after the molding material is extruded by one of the screws through one of the dies, the resulting molding material is again extruded by another screw through another die.

Desirably, the extrusion-molding machine according to the present invention comprises a cutting member used for cutting the molding material extruded by the one of the screws through the one of the dies.

Desirably, the extrusion-molding machine according to the present invention comprises two to four screw mixers each provided with the screw and the die.

An extrusion-molding method according to the present invention is an extrusion-molding method using an extrusion-molding machine provided with a screw having a blade portion for extruding a molding material, the screw disposed in a tightly-closed space, and a die, and the extrusion-molding method comprises: mixing a wet mixture containing inorganic powder serving as a molding material; and at the same time continuously extruding the wet mixture through the die placed at the outlet of the space, wherein the space is maintained in a reduced-pressure atmosphere, and a high-hardness coat layer is formed at least on the blade portion.

In the extrusion-molding method according to the present invention, desirably, the main component of the high-hardness coat layer comprises tungsten carbide, and the high-hardness coat layer has a surface roughness Ra of about 10 μm or less. Moreover, desirably, the high-hardness coat layer has a porosity of about 0.3% or less, and the maximum dimension of recess portions on the surface of the high-hardness coat layer is at least about 1 μm and at most about 50 μm.

Moreover, in the case where the main component of the high-hardness coat layer comprises tungsten carbide as described above, desirably, nickel is used as a binder for forming the high-hardness coat layer.

Furthermore, the high-hardness coat layer desirably has a thickness of at least about 300 µm and at most about 1200 µm, and desirably has a Vickers hardness of about 2000 HV or more.

In the extrusion-molding method according to the present invention, desirably, the space has an inner pressure that is lower than the atmospheric pressure by at least about 50 kPa and at most about 100 kPa.

In the extrusion-molding method according to the present invention, desirably, the wet mixture has a moisture content of at least about 10% by weight and at most about 20% by weight.

In the extrusion-molding method according to the present invention, desirably, the period of time from charging of the wet mixture into the extrusion-molding machine till extrusion of the wet mixture is at least about 50 minutes and at most about 90 minutes.

In the extrusion-molding method according to the present invention, desirably, the extrusion-molding machine comprises a plurality of the screws and the same number of the dies as the screws, wherein a wet mixture, which has been mixed by one of the screws and then continuously extruded through one of the dies, is again mixed by another screw and continuously extruded through another die.

In the extrusion-molding method according to the present invention, desirably, the extrusion molding machine comprises a cutting member used for cutting the molding material extruded by the one of the screws through the one of the dies.

In the extrusion-molding method according to the present invention, desirably, the extrusion molding machine comprises two to four screw mixers each provided with the screw and the die.

A method for manufacturing a honeycomb structured body according to the present invention comprises: obtaining a wet mixture containing inorganic powder by wet-mixing; extrusion molding the wet mixture for molding thereof to manufacture a pillar-shaped honeycomb molded body having a number of cells, each penetrating in a longitudinal direction, placed in parallel with one another with a cell wall therebetween; and firing the honeycomb molded body to manufacture a honeycomb structured body made of a honeycomb fired body, wherein the extrusion-molding is carried out using an extrusion-molding machine comprising a screw having a blade portion for extruding a molding material with a high-hardness coat layer formed at least on the blade portion, the screw disposed in a tightly-closed space, and a die, by mixing the wet mixture while maintaining the space in a reduced-pressure atmosphere, and at the same time continuously extruding the wet mixture through the die placed at the outlet of the space.

In the method for manufacturing a honeycomb structured body according to the present invention, desirably, the main component of the high-hardness coat layer comprises tungsten carbide, and the high-hardness coat layer has a surface roughness Ra of about 10 µm or less. Moreover, desirably, the high-hardness coat layer has a porosity of about 0.3% or less, and the maximum dimension of recess portions on the surface of the high-hardness coat layer is at least about 1 µm and at most about 50 µm.

Moreover, in the case where the main component of the high-hardness coat layer comprises tungsten carbide as described above, desirably, nickel is used as a binder for forming the high-hardness coat layer.

Furthermore, the high-hardness coat layer desirably has a thickness of at least about 300 µm and at most about 1200 µm, and desirably has a Vickers hardness of about 2000 HV or more.

In the method for manufacturing a honeycomb structured body according to the present invention, desirably, the space has an inner pressure that is lower than the atmospheric pressure by at least about 50 kPa and at most about 100 kPa.

In the method for manufacturing a honeycomb structured body according to the present invention, desirably, the wet mixture has a moisture content of at least about 10% by weight and at most about 20% by weight.

In the method for manufacturing a honeycomb structured body according to the present invention, desirably, the period of time from charging of the wet mixture into the extrusion-molding machine till extrusion of the wet mixture is at least about 50 minutes and at most about 90 minutes.

In the method for manufacturing a honeycomb structured body according to the present invention, desirably, the extrusion-molding machine comprises a plurality of the screws and the same number of the dies as the screws, wherein a wet mixture, which has been mixed by one of the screws and then continuously extruded through one of the dies, is again mixed by another screw and continuously extruded through another die.

In the method for manufacturing a honeycomb structured body according to the present invention, desirably, the extrusion-molding machine comprises a cutting member used for cutting the molding material extruded by the one of the screws through the one of the dies.

In the method for manufacturing a honeycomb structured body according to the present invention, desirably, the extrusion-molding machine comprises two to four screw mixers each provided with the screw and the die.

In the method for manufacturing a honeycomb structured body according to the present invention, desirably, the honeycomb structured body comprises a plurality of the honeycomb fired bodies which are bonded to one another by interposing sealing material layers.

In the method for manufacturing a honeycomb structured body according to the present invention, desirably, the honeycomb structured body comprises a single piece of the honeycomb fired body.

In the method for manufacturing a honeycomb structured body according to the present invention, desirably, a predetermined cell of the honeycomb structured body is filled in with a sealing material paste so that the honeycomb structured body is used as a ceramic filter.

In the method for manufacturing a honeycomb structured body according to the present invention, desirably, no cells of the honeycomb structured body are filled in with a sealing material paste so that the honeycomb structured body is used as a catalyst supporting carrier.

DESCRIPTION OF THE EMBODIMENTS

Figure 1:
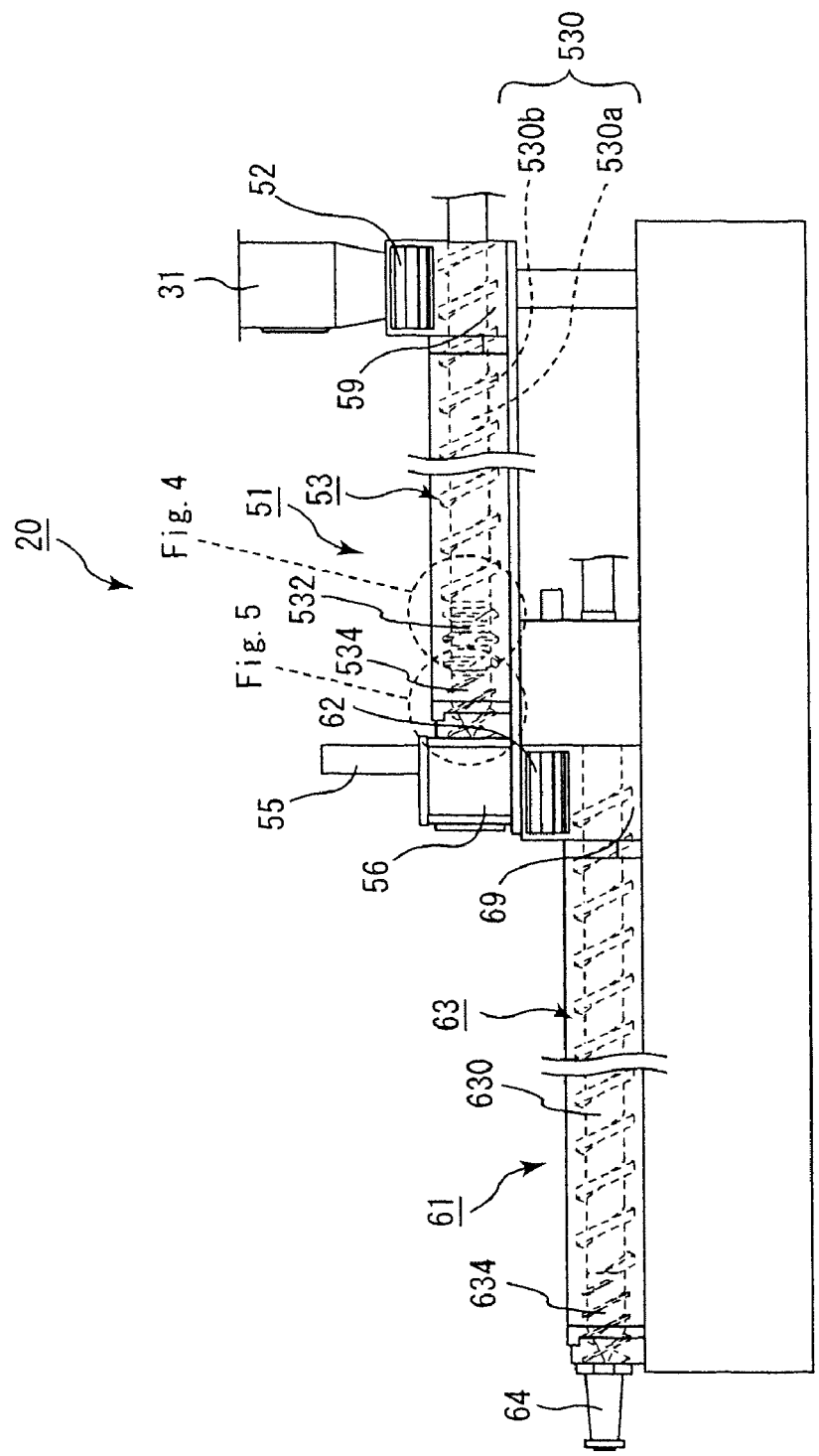
FIG. 1 is a cross-sectional view that schematically shows an extrusion-molding machine according to one embodiment of the present invention.

An extrusion-molding machine according to the embodiments of the present invention comprises: a screw having a blade portion for extruding a molding material, the screw disposed in a tightly-closed space; and a die for molding an extruded molding material, wherein the space is maintained in a reduced-pressure atmosphere, and a high-hardness coat layer is formed at least on the blade portion.

In accordance with the extrusion-molding machine according to the embodiments of the present invention, the tightly closed space is maintained in a reduced-pressure atmosphere; therefore, when the wet mixture is kneaded by the screw, air bubbles tend not to been trained therein. As a result, the wet mixture more easily has a uniform composition and is more easily homogenized physically so that it may become easier to manufacture a molded body which has no deviations in its shape and composition, and has a shape almost the same as the designed one.

Moreover, since the high-hardness coat layer is formed at least on the blade portion, even when the wet mixture containing ceramic powder is kneaded, abrasion of the blade portion is kept low, and thus it may become easier to continuously manufacture molded bodies efficiently without the need of replacing parts such as a screw for a long period of time.

An extrusion-molding method according to the embodiments of the present invention is an extrusion-molding method using an extrusion-molding machine provided with a screw having a blade portion for extruding a molding material, the screw disposed in a tightly-closed space, and a die, and the extrusion-molding method comprises: mixing a wet mixture containing inorganic powder serving as a molding material; and at the same time continuously extruding the wet mixture through the die placed at the outlet of the space, wherein the space is maintained in a reduced-pressure atmosphere, and a high-hardness coat layer is formed at least on the blade portion.

In accordance with the extrusion-molding method according to the embodiments of the present invention, molding of a pillar-shaped molded body is continuously carried out by using the extrusion-molding machine in which the tightly-closed space is maintained in a reduced-pressure atmosphere; therefore, even when the wet mixture is kneaded by the screw, air bubbles tend not to be entrained therein. As a result, the wet mixture more easily has a uniform composition and is more easily homogenized physically so that it may become easier to manufacture a molded body which has no deviations in its shape and composition, and has a shape almost the same as the designed one.

Moreover, since the high-hardness coat layer is formed at least on the blade portion, even when the wet mixture containing ceramic powder is kneaded, abrasion of the blade portion is kept low, and thus it may become easier to continuously manufacture molded bodies efficiently without the need of replacing parts such as a screw for a long period of time.

The method for manufacturing a honeycomb structured body according to the embodiments of the present invention comprises: obtaining a wet mixture containing inorganic powder by wet-mixing; extrusion molding the wet mixture for molding thereof to manufacture a pillar-shaped honeycomb molded body having a number of cells, each penetrating in a longitudinal direction, placed in parallel with one another with a cell wall therebetween; and firing the honeycomb molded body to manufacture a honeycomb structured body made of a honeycomb fired body, wherein the extrusion-molding is carried out using an extrusion-molding machine comprising a screw having a blade portion for extruding a molding material with a high-hardness coat layer formed at least on the blade portion, the screw disposed in a tightly-closed space, and a die, by mixing the wet mixture while maintaining the space in a reduced-pressure atmosphere, and at the same time continuously extruding the wet mixture through the die placed at the outlet of the space.

In accordance with the method for manufacturing a honeycomb structured body according to the embodiments of the present invention, a honeycomb structured body is manufactured by using the above-mentioned extrusion-molding machine and the extrusion-molding method; therefore, even when the wet mixture is kneaded by the screw, air bubbles tend not to be entrained therein. As a result, the wet mixture more easily has a uniform composition and is more easily homogenized physically so that it may become easier to manufacture a molded body which has no deviations in its shape and composition, and has a shape almost the same as the designed one, and by using this honeycomb molded body, a honeycomb structured body having almost the same characteristics as the designed ones may be more easily manufactured.

Additionally, since the high-hardness coat layer is formed at least on the blade portion of an extrusion molding machine, even when the wet mixture containing ceramic powder is kneaded, abrasion of the blade portion is kept low, and thus it may become easier to continuously manufacture molded bodies efficiently without the need of replacing parts such as a screw for a long period of time.

The following description will discuss the extrusion-molding machine and the extrusion-molding method according to the embodiments of the present invention.

With respect to the material for an inorganic powder contained in the wet mixture to be used in the present invention, examples thereof include: nitride ceramic materials such as aluminum nitride, silicon nitride, boron nitride and titanium nitride; carbide ceramic materials such as silicon carbide, zirconium carbide, titanium carbide, tantalum carbide and tungsten carbide; oxide ceramic materials such as alumina, zirconium, cordierite, mullite, and aluminum titanate; and the like, although not particularly limited thereto.

Among these, non-oxide ceramic materials are preferably used, and in particular, silicon carbide is preferably used. This is because silicon carbide is superior in heat resistance, mechanical strength, thermal conductivity and the like.

Here, a silicon-containing ceramic material formed by blending metal silicon in the above-mentioned ceramic material, a ceramic material that is combined by silicon or a silicate compound and the like may also be used, and for example, a material in which metal silicon is blended in silicon carbide is also preferably used. In this case, silicon carbide powder and metal silicon powder are used to manufacture a ceramic molded body.

In the above-mentioned wet mixture, an organic binder, a dispersant solution and the like are contained. Moreover, a plasticizer and a lubricant may be contained in the wet mixture.

With respect to the above-mentioned organic binder, examples thereof include methylcellulose, carboxy methylcellulose, hydroxy ethylcellulose, polyethylene glycol and the like, although not particularly limited thereto. Among these, methylcellulose is more desirably used.

Here, the compounding amount of the organic binder is desirably at least about 1 part by weight and at most about 10 parts by weight with respect to 100 parts by weight of the ceramic powder.

With respect to the above-mentioned dispersant solution, for example, water, an organic solvent such as benzene, alcohol such as methanol, and the like may be used, although not particularly limited thereto.

When water is used as the dispersant solution, the lower limit value of the moisture content in the wet mixture is desirably set to about 10% by weight, and more desirably set to about 12% by weight. The upper limit value of the moisture content in the wet mixture is desirably set to about 20% by weight, and more desirably set to about 15% by weight. When the moisture content is about 10% by weight or more, cracks and the like tend not to occur in the molded body; in contrast, when the moisture content is about 20% by weight or less, it may become less difficult for the extruded molded body to retain a predetermined shape until it is dried.

Moreover, the moisture content of a molded body to be manufactured is also desirably set in the above-mentioned range.

For this reason, it is desirable to prevent the moisture content of the wet mixture from changing by mixing the wet mixture while cooling inside the molding machine. By maintaining the amount of moisture at a certain level, it may become easier to keep the viscosity of the wet mixture at a certain level.

With respect to the plasticizer, for example, glycerin and the like may be used, although not particularly limited thereto.

Moreover, with respect to the lubricant, for example, polyoxy alkylene-based compounds, such as polyoxyethylene alkyl ether and polyoxy propylene alkyl ether, and the like may be used, although not particularly limited thereto.

Specific examples of the lubricant include: polyoxyethylene monobutyl ether, polyoxypropylene monobutyl ether, and the like.

Figure 2B:
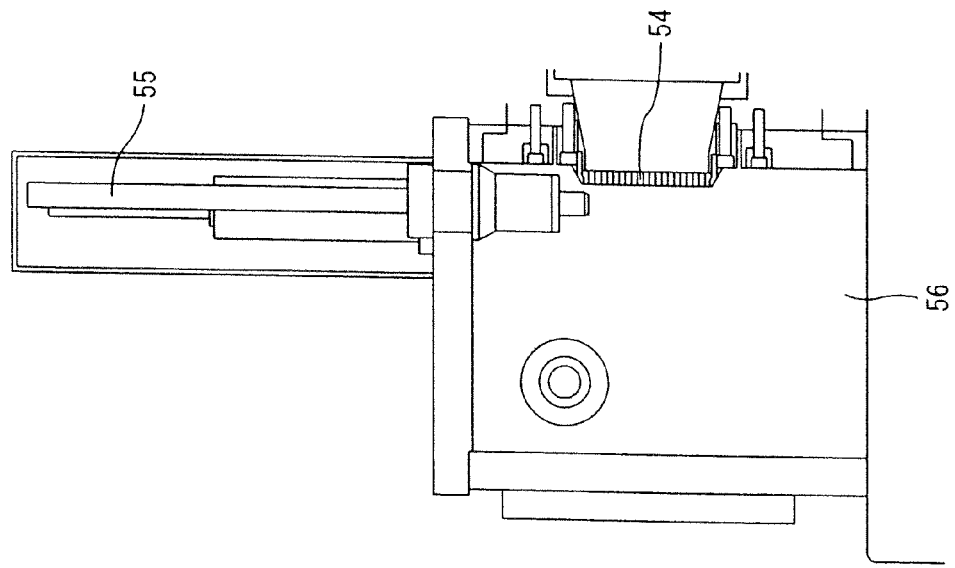
FIG. 2B is a cross-sectional view taken along line A-A of FIG. 2A.
Figure 2A:
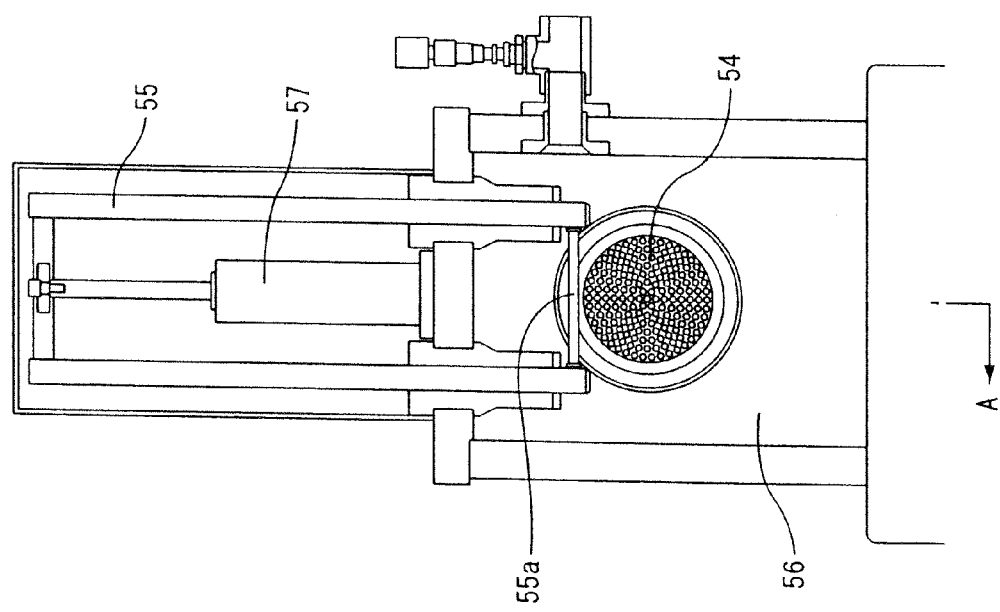
FIG. 2A is a longitudinal cross-sectional view that schematically shows the proximity of a cutter configuring the extrusion-molding machine according to one embodiment of the present invention.

FIG. 1 is a cross-sectional view that schematically shows an extrusion-molding machine according to one embodiment of the present invention; FIG. 2A is a longitudinal cross-sectional view that schematically shows the proximity of a cutter configuring the extrusion-molding machine according to one embodiment of the present invention; and FIG. 2B is a cross-sectional view taken along line A-A of FIG. 2A.

Figure 3:
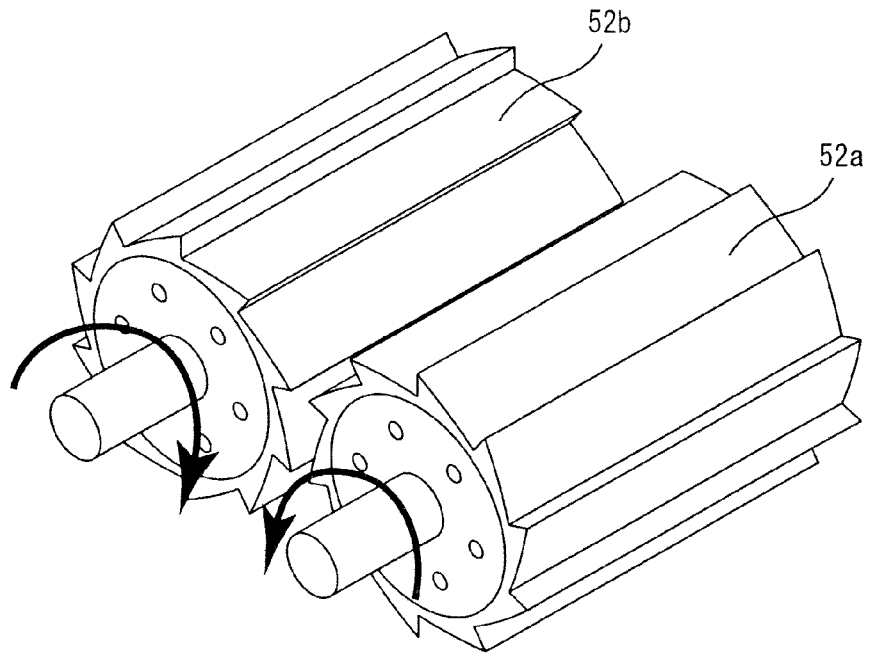
FIG. 3 is a perspective view that schematically shows a kneading-and-pressing roller configuring the extrusion-molding machine according to one embodiment of present invention.
Figure 4:
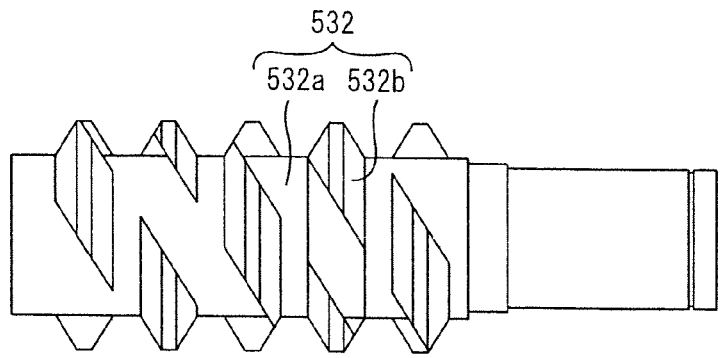
FIG. 4 is a front view that schematically shows an entangling screw configuring an upper-stage screw of the extrusion-molding machine according to one embodiment of the present invention.
Figure 5:
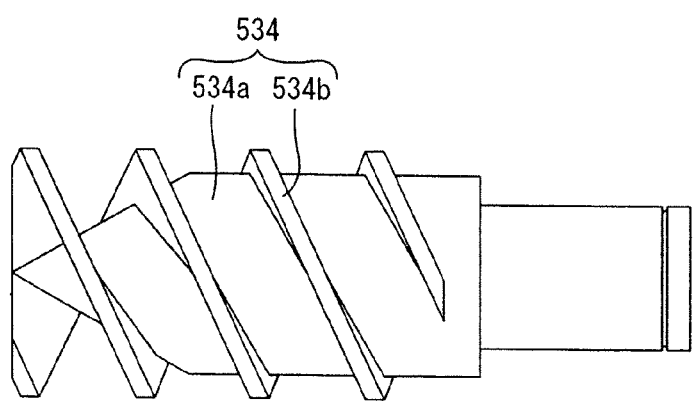
FIG. 5 is a front view that shows a tip W-blade screw configuring a middle-stage screw of the extrusion-molding machine according to one embodiment of the present invention.

FIG. 3 is a perspective view that schematically shows a kneading-and-pressing roller configuring the extrusion-molding machine according to one embodiment of present invention; FIG. 4 is a front view that schematically shows an entangling screw configuring an upper-stage screw of the extrusion-molding machine according to one embodiment of the present invention; and FIG. 5 is a front view that shows a tip W-blade screw configuring a middle-stage screw of the extrusion-molding machine according to one embodiment of the present invention.

This extrusion-molding machine 20 comprises two stages of screw mixers, that is, an upper-stage screw mixer 51 and a lower-stage screw mixer 61, each of which is provided with a screw having a screw shaft and screw blades (blade portions) placed therein.

A charging hopper 31, which receives a wet mixture preliminary prepared by mixing the materials, is installed at one end of the upper screw mixer 51, and a kneading-and-pressing roller 52 used for pressing the wet mixture into the upper screw mixer 51 is installed at a receiving inlet 59 placed below the charging hopper 31.

As shown in FIG. 3, this kneading-and-pressing roller 52 is configured by a pair of kneading-and-pressing rollers 52a and 52b, each having blades that are placed perpendicularly to the rotation direction of the roller, and the wet mixture dropped through the charging hopper 31 is kneaded and pressed between the pair of kneading-and-pressing rollers 52a and 52b, and these rollers are then rotated inward so as to extrude the wet mixture downward so that the wet mixture is supplied into the upper screw mixer 51.

The upper-stage screw mixer 51 is provided with a feed screw 530 for kneading and moving the wet mixture, an entangling screw 532 (see FIG. 4) that is attached to the tip of the feed screw 530 mainly for kneading the wet mixture, and an upper-stage screw 53 formed by a W-blade screw 534 (see FIG. 5) that is attached to the further tip thereof. In the feed screw 530, a screw blade (blade portion) 530b is helically wound around the screw shaft 530a so that this blade carries out kneading and at the same time extruding the wet mixture forward.

As shown in FIG. 4, the entangling screw 532 has a structure in which a plurality of screw blades 532b are formed in a manner so as to form rings in the circumferential direction of the screw shaft 532a, with one part of each screw blade cut in a diagonal direction, forming a portion with no screw blade 532b. By allowing the wet mixture to pass through these portions, kneading progresses further.

Moreover, as shown in FIG. 5, the W-blade screw 534 has a structure in which the screw blade 534b is in a double helical shape, and the tip of the screw shaft 534a tapers sharply so that the wet mixture may be more easily extruded quantitatively.

An upper-stage die 54 (mouth ring) (see FIGS. 2A and 2B) in which a number of through holes are formed is attached to the other end of the upper-stage screw mixer 51, and the wet mixture, after having passed through the W-blade screw 534, is pressed into the upper-stage die 54 so that the wet mixture is extruded in a stick shape or in a thick noodle shape.

As shown in FIGS. 2A and 2B, a reduced pressure chamber 56 is provided at a portion of the upper die 54 through which the wet mixture is extruded, and the inside thereof is maintained in a reduced-pressure state close to vacuum. Here, the reduced-pressure chamber 56 forms a part of the tightly-closed space.

Moreover, inside of each of the upper-stage screw mixer 51 and the lower-stage screw mixer 61 is also maintained in a reduced-pressure state. This arrangement is made so as to prevent bubbles (air) from entraining into the wet mixture. When bubbles are entrained into the wet mixture, defects caused by the bubbles tend to occur in a partition wall and the like when a molded body is manufactured.

Moreover, an upper-stage cutter 55, serving as a cutting member, is placed inside the reduced-pressure chamber 56 near the upper-stage die 54. In other words, the cutting edge 55a of the upper-stage cutter 55 is located inside the reduced-pressure chamber 56 so that the cutting edge is allowed to reciprocally move up and down near the upper-stage die 54 by an air cylinder 57 installed in the reduced-pressure chamber 56 so that the wet mixture that has been extruded in a thick noodle shape (stick shape) from the upper-stage die 54 is cut into fine lumps.

A number of small lumps thus cut fall into the receiving inlet 69 of the lower-stage screw mixer 61 located right below, and are pressed into the lower-stage screw mixer 61 by the kneading-and-pressing roller 62.

The lower-stage screw mixer 61 is provided with a lower-stage screw 63 comprising a feed screw 630 and a W-blade screw 634 attached to the tip of the feed screw 630, and the lumps are pressed into the die 64 quantitatively at its tip portion.

By repeating kneading in this manner, the mixing progresses sufficiently to form a mixture which is uniformly adjusted with respect to the moisture, composition and the like so that the mixture is continuously extruded from the die 64; thus, a rectangular pillar-shaped molded body having a number of cells formed in a longitudinal direction is continuously formed.

In the extrusion-molding machine 20 shown in FIG. 1, two screw mixers are provided to carry out kneading. In the present invention, although the number of screw mixers is not particularly limited, desirably two to four screw mixers are provided. In the case of only one screw mixer, it sometimes becomes difficult to sufficiently carry out kneading; on the other hand, even when five or more screw mixers are provided, the degree of kneading is not improved significantly, resulting in disadvantages from the economic point of view.

Moreover, in the extrusion-molding machine 20 shown in FIG. 1, the wet mixture is pressed into the screw mixer by the kneading and pressing roller; however, the wet mixture may be pressed into the screw mixer by using another means, or simply a charging hopper may be provided. The combination of the screws installed in the screw mixer is not limited to the above-mentioned combination, and may be, for example, only the feed screw, or other combinations.

In the extrusion-molding machine 20, a high-hardness coat layer is formed at least on the screw blade of each of the upper-stage screw 53 and the lower-stage screw 63 so as to prevent abrasion more easily. This is because the screw blade tends to contact with the wet mixture most often and is more susceptible to abrasion.

Here, the high-hardness coat layer is desirably formed on the entire surface of each screw blade of the upper-stage screw 53 and the lower-stage screw 63. Thus, the entire screw may be more easily prevented from abrasion.

The lower limit value of the thickness of the high-hardness coat layer is desirably set to about 300 μm, and more desirably about 500 μm. The upper limit value of the thickness of the high-hardness coat layer is desirably set to about 1200 μm, and more desirably about 1000 μm.

When the thickness is about 300 μm or more, it may become easier to ensure a sufficient abrasion resistant characteristics; in contrast, when the thickness is about 1200 μm or less, peeling and cracks tend not to occur.

Examples of materials for the screw include stainless steel and the like, and the high-hardness coat layer has a higher hardness than the materials for the screw.

In the present invention, the high-hardness coat layer means a coat layer having a Vickers hardness of about 1000 HV or more measured based on JIS Z 2244.

Although it is acceptable if the Vickers hardness of the high-hardness coat layer is about 1000 HV or more, the Vickers hardness of about 2000 HV or more is more desirable since it provides an excellent abrasion resistance.

Examples of the main component of the above-mentioned high-hardness coat layer include ceramic coating material, industrial grade diamond, plating coat film and the like. Specifically, examples of the materials may include materials having tungsten carbide (HV: about 2500), titanium carbide (HV: about 3600), titanium nitride (HV: about 1800 to about 2500), cubic boron nitride (HV: about 2700), CVD diamond (HV: about 2500 to about 4000), DLC (Diamond-like Carbon/HV: about 2000 to about 4000), ZrN (HV: about 2000 to about 2200), CrN (HV: about 1800 to about 2200), TiCN (HV: about 2300 to about 3500), TiAlN (HV: about 2300 to about 3300), $Al_2O_3$ (HV: about 2200 to about 2400), $Ti_3$ (HV: about 2300), WC-12% CO (HV: about 1200) and the like as the main component. Further, examples of the plating coat film may include electroless nickel plating (treated at about 400° C.) (HV: about 1000), $CrC_4$ (hard chromium carbide about 4%) plating (HV: about 1200), nickel plating (SiC content of about 2% by weight to about 6% by weight: treated at about 400° C.) (HV: about 1300 to about 1400), ultra-hard chrome plating (HV: about 1200) and the like.

Among these, tungsten carbide is desirably used. In the case where a high-hardness coat layer is formed through flame spray coating, this material makes it easier to form a layer that is uniform, superior in adhesion to the screw blade and firmly bonded thereto. Moreover, the high-hardness coat layer made of tungsten carbide may be more easily formed at a comparatively low cost.

Moreover, upon forming a high-hardness coat layer mainly comprising tungsten carbide, the high-hardness coat layer desirably contains a binder component. Here, examples of the binder contained in the high-hardness coat layer include nickel, cobalt and the like. Among these, nickel is desirably used. This is because nickel is superior in abrasion resistance. In particular, in the case where a flame coated layer comprising tungsten carbide as a main component and nickel as a binder is used as the high-hardness coat layer, coming off of particles mainly composed of tungsten carbide may tend to be small in comparison with the flame coated layer comprising tungsten carbide as a main component and cobalt and the like as a binder.

The surface roughness Ra of the high-hardness coat layer is desirably set to about 10 μm or less.

The surface roughness Ra of about 10 μm or less may tend not to cause a deterioration in the extruding efficiency.

Here, in the present specification, the extruding efficiency means the rate of the extrusion amount (volume) per rotation of the screw with respect to the optimal value, and the greater the extrusion amount, the higher the extruding efficiency becomes.

Moreover, the initial (before use) surface roughness Ra of the high-hardness coat layer is desirably set to about 1 μm or less. This setting desirably ensures the above-mentioned surface roughness Ra even after a long term use.

Here, the lower limit value of the surface roughness Ra is not particularly limited; and the smaller the value is, the better from the viewpoint of extruding efficiency. Here, as will be described later, the surface roughness Ra of the high-hardness coat layer can be adjusted by a polishing process; however, in order to make the surface roughness Ra smaller, the corresponding process requires more time and cost, and even when the surface roughness Ra is made extremely small, the resulting effects are not improved so much. From these points of view, the lower limit value of the surface roughness Ra is desirably set to about 0.1 µm. Here, the surface roughness Ra is indicated as a center line average roughness in compliance with JIS B 0601 (1994), and, for example, this value can be measured by a tracer-type surface roughness measuring device and the like.

Upon forming the high-hardness coat layer, for example, a buff polishing process, a polishing process using a grind stone or sheet and the like may be carried out, if necessary, in order to adjust the surface roughness Ra within the above-mentioned range.

With respect to buffs to be used in the buff polishing, for example, abrasive grain-containing buffs such as a disc-type buff, a flap-type buff and a coil-shaped buff, and non-abrasive grain buffs such as polypropylene non-woven cloth, may be used. With respect to the abrasive grains to be used in the abrasive grain-containing buffs, for example, aluminum silicate, aluminum oxide, silicon carbide and the like may be used.

The porosity of the high-hardness coat layer is desirably set to about 0.3% or less.

This is because, when the porosity is 0.3% or less, the surface roughness Ra of the high-hardness coat layer may be more easily reduced.

The following description will more specifically explain this setting by exemplifying a high-hardness coat layer formed through flame spray coating: in the case of a high-hardness coat layer formed through flame spray coating, when the porosity is high, secondary particles having a comparatively large diameter tend to exist in the flame coated layer, and when such secondary particles having a large diameter come off, the surface roughness Ra increases.

In the present specification, the porosity refers to an area rate of a portion occupied by pores in a photographed image of a cross section of the high-hardness coat layer.

The maximum dimension of recess portions on the surface of the high-hardness coat layer is desirably set to at least about 1 µm and at most about 50 µm.

In particular, in the case where the high-hardness coat layer is formed through flame spray coating, the maximum dimension of recess portions of the surface is desirably set within the above-mentioned range. Normally, the recess portions on the surface of the high-hardness coat layer formed through flame spray coating are caused by coming-off of particles (primary particles and secondary particles), and when the maximum dimension of the recess portions is set within the above-mentioned range, the surface roughness Ra does not become so large. Here, with respect to the maximum dimension of the recess portions, the smaller the maximum dimension, the better; however, since the particle diameter of the primary particles forming the high-hardness coat layer formed through flame spray coating is normally about 1 µm, the desirable lower limit value of the maximum dimension is set to about 1 µm.

Here, in the present specification, the maximum dimension of recess portions on the surface of the high-hardness coat layer means the longest portion of the opening of the recess portion. Moreover, the primary particle refers to a minimum unit particle that exists without breaking the bonding between molecules, and the secondary particle refers to a particle formed by aggregation of a plurality of primary particles.

The pressure of each of the inside of the screw mixer and the inside of the reduced-pressure chamber (pressure in the above-mentioned space) is desirably set to a level that is lower than the atmospheric pressure by at least about 50 kPa and at most about 100 kPa (that is, (the atmospheric pressure—about 100 kPa) to (the atmospheric pressure—about 50 kPa)).

When the pressure is (the atmospheric pressure—about 50 kPa) or less, bubbles tend not to be entrained into the wet mixture, so that defects or the like tend not to occur in the molded body. In contrast, when the pressure is (the atmospheric pressure—about 100 kPa) or more, high vacuum state tends not to be generated, and the wet mixture tends not to be dried to be hardened, and therefore, the moldability tends not to deteriorate.

The pressure in the space is desirably set to a level that is lower than the atmospheric pressure by at least about 60 kPa and at most about 100 kPa.

In the extrusion-molding machine 20, the period of time from the charging of the material into the extrusion-molding machine 20 till the extrusion of the resulting material is desirably set to at least about 50 minutes and at most about 90 minutes. This is because the material needs to be sufficiently mixed so as to make the entire composition including water and the like uniform.

Moreover, upon extrusion-molding, the speed at which the molded body is extruded is desirably set to at least about 3500 mm/minute and at most about 4500 mm/minute. The speed of about 3500 mm/minute or more is desirable because the production efficiency tends not to be lowered; in contrast, when the speed is about 4500 mm/minute or less, it may become easier to form a ceramic molded body having a designed dimension, and defects tend not to occur in the ceramic molded body manufactured.

Generally speaking, upon kneading material powders containing inorganic powder having a high hardness such as silicon carbide powder, in the case where screws made of a normal metal material are used, since the screws are easily subjected to abrasion, the screws have to be replaced frequently.

However, in the embodiments of the present invention, since the high-hardness coat layer is formed at least on the blade portion of the screw, the screw becomes resistant to abrasion more easily so that it may become easier to drive the machine for a long time without the need of replacing the screws, and consequently, an increase in facility costs may be more easily avoided. Normally, the manufacturing operation may be more easily carried out continuously for about three months, without the need of replacing the screws.

Moreover, since the inside of the screw mixing machine is decompressed, bubbles are hardly entrained into the wet mixture so that it may become easier to prevent defects caused by bubbles in the molded body. Moreover, since the wet mixture is kneaded in the screw mixer and extruded through a die (cap) with a number of through holes formed therein, and mixing is carried out after the extruded thick noodle-shaped (stick shaped) wet mixture is further thinly cut into fine lumps, mixture irregularity tends not to be caused and it may become easier to carry out mixing sufficiently, forming a wet mixture having a uniform composition, and as a result, a molded body having uniform properties may be more easily manufactured.

Here, in the extrusion-molding machine, the air cylinder 57 is installed in the reduced pressure chamber 56 so as to exert a driving force for the cutter, which is, however, not limited to the air cylinder 57, and any other device such as an oil cylinder may be used as long as it provides reciprocating movements.

The following description will discuss a method for manufacturing a honeycomb structured body according to the embodiments of the present invention.

In the method for manufacturing a honeycomb structured body according to the embodiments of the present invention, by using an extrusion-molding machine provided with a screw and a die, after kneading a wet mixture containing inorganic powder in the extrusion-molding machine, the wet mixture is extrusion-molded to form a honeycomb structured body having a number of cells, each penetrating in a longitudinal direction, placed in parallel with one another with a cell wall therebetween, and a honeycomb fired body is manufactured by firing the honeycomb molded body. Thereafter, a plurality of honeycomb fired bodies are bonded to one another through bonding material layers, and this is processed into a predetermined shape with a sealing material layer formed on the outer periphery thereof so that a honeycomb structured body is manufactured.

With respect to the extrusion-molding machine, the above-mentioned extrusion-molding machine according to the embodiments of the present invention is desirably used, although not particularly limited thereto. Moreover, with respect to an embodiment of the extrusion-molding method, the above-mentioned extrusion molding method according to the embodiments of the present invention is desirably used, although not particularly limited thereto.

Therefore, in this case, the extrusion-molding process will be explained briefly, and processes other than the extrusion-molding process will be explained in more detail.

Figure 6:
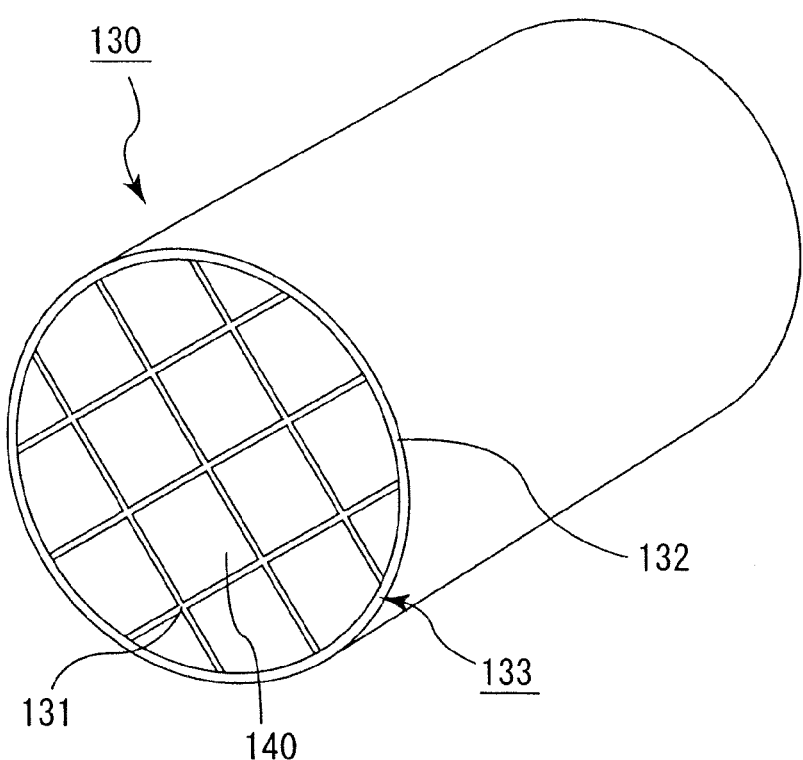
FIG. 6 is a perspective view that schematically shows one example of a honeycomb structured body according to one embodiment of the present invention.
Figure 7A:
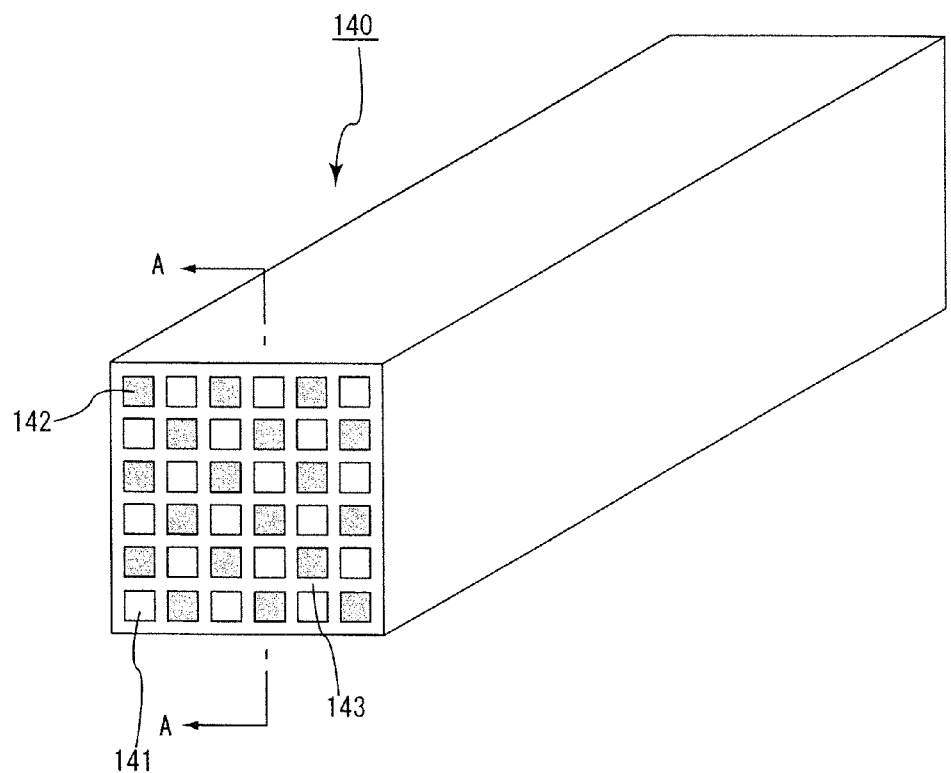
FIG. 7A is a perspective view that schematically shows a honeycomb fired body forming the honeycomb structured body according to one embodiment of the present invention.

FIG. 6 is a perspective view that schematically shows one example of a honeycomb structured body according to one embodiment of the present invention; FIG. 7A is a perspective view that schematically shows a honeycomb fired body forming the honeycomb structured body according to one embodiment of the present invention, and FIG. 7B is a cross-sectional view taken along line A-A of FIG. 7A.

In a honeycomb structured body 130, a plurality of honeycomb fired bodies 140 shown in FIG. 7A are bonded to one another by interposing a sealing material layer (adhesive layer) 131 to form a ceramic block 133, and a sealing material layer (coat layer) 132 is further formed on the outer periphery of this ceramic block 133.

Figure 7B:
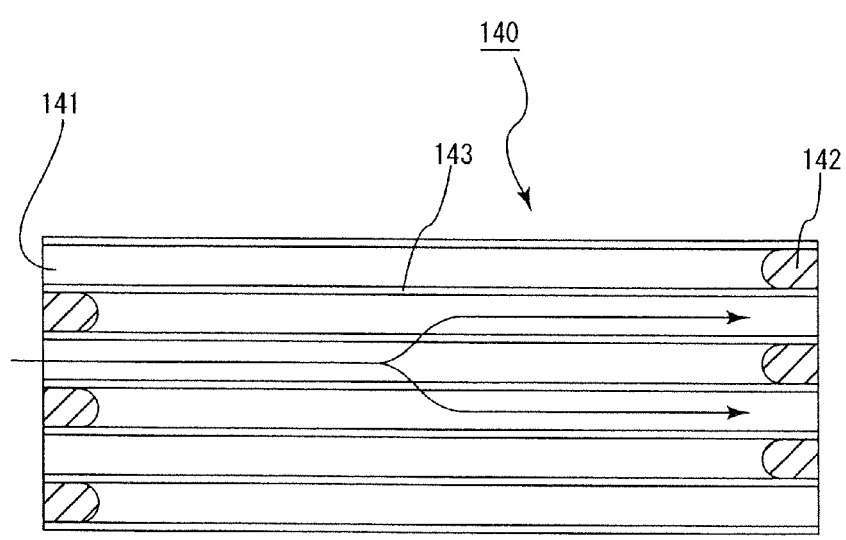
FIG. 7B is a cross-sectional view taken along line A-A of FIG. 7A.

Moreover, as shown in FIGS. 7A and 7B, the honeycomb fired body 140 has a number of cells 141 longitudinally placed in parallel with one another so that each cell wall 143 that separates the cells 141 is allowed to function as a filter.

In other words, as shown in FIG. 7B, each of the cells 141, formed in the honeycomb fired body 140, is sealed with a plug material layer 142 at either one of ends on its exhaust gas inlet side and exhaust gas outlet side. Therefore, exhaust gases that have entered one cell 141 are discharged from another cell 141 after having always passed through each cell wall 143 that separates the cells 141; thus, when exhaust gases pass through the cell wall 143, particulates are captured by the cell wall 143 so that the exhaust gases are purified.

Moreover, the following description will discuss the method for manufacturing a honeycomb structured body according to the embodiments of the present invention, by exemplifying a case in which, by using silicon carbide powder as inorganic powder, a honeycomb structured body made of silicon carbide is manufactured.

The material for the honeycomb structured body to be manufactured in the manufacturing method according to the embodiments of the present invention is not limited to silicon carbide, and ceramic materials of the kinds explained in the section of the embodiments of the extrusion-molding machine may be used.

(1) In the method for manufacturing a honeycomb structured body according to the embodiments of the present invention, first, silicon carbide powder and an organic binder (organic powder) having different average particle diameters are dry-mixed to prepare mixed powder.

With respect to the particle diameter of silicon carbide powder, although not particularly limited, those which are less susceptible to shrinkage in the succeeding firing process are desirably used, and for example, a mixed powder prepared by combining 100 parts by weight of powder having an average particle diameter of at least about 0.3 μm and at most about 50 μm with at least about 5 parts by weight and at most about 65 parts by weight of powder having an average particle diameter of at least about 0.1 μm and at most about 1.0 μm, is desirably used.

In order to adjust the pore diameter and the like of the honeycomb fired body, although a method of adjusting the firing temperature is effective, the pore diameter may be more easily adjusted within a fixed range by adjusting the particle diameter of the inorganic powder.

(2) Next, a mixed solution is prepared by mixing a liquid-state plasticizer, a lubricant and water, and successively, by mixing the mixed powder prepared in the above-mentioned process (1) and the above-mentioned mixed solution in a wet mixing machine, a wet mixture to be used for manufacturing a molded body is prepared.

Since the kind and amount of the organic binder, the kinds of a plasticizer and a lubricant, the amount of water and the like have been described in the embodiments of the above-mentioned extrusion-molding method, the description thereof is omitted.

Here, a pore forming agent, such as balloons that are fine hollow spheres composed of an oxide-based ceramic material, spherical acrylic particles and graphite, may be added to the above-mentioned wet mixture, if necessary.

(3) The above-mentioned wet mixture, mixed and prepared, is transported to the extrusion-molding machine provided with a screw and a die by a transporting device, and after having been sufficiently kneaded in the extrusion-molding machine, the resulting wet mixture is allowed to pass through the die so that a pillar-shaped honeycomb molded body having a number of cells, each penetrating in a longitudinal direction, placed in parallel with one another with a cell wall therebetween is manufactured.

Next, the honeycomb molded body is dried by using a drying apparatus, such as a microwave drying apparatus, a hot-air drying apparatus, a dielectric drying apparatus, a reduced-pressure drying apparatus, a vacuum drying apparatus and a freeze drying apparatus, and the honeycomb molded body after the drying process is cut near the both two ends so as to have a predetermined length.

Next, a predetermined amount of plug material paste that forms plugs is filled into ends on the outlet side of a group of cells on the inlet side and ends on the inlet side of a group of cells on the outlet side, if necessary, so that predetermined cells are sealed.

With respect to the plug material paste, although not particularly limited, those plug material pastes that allow the plugs manufactured through post processes to have a porosity of at least about 30% and at most about 75% are desirably used, and, for example, the same material as that used for the above-mentioned wet mixture may be used.

The filling of the plugging material paste can be carried out on demand, and when the plugging material paste has been filled in the predetermined cells, for example, the resulting honeycomb structured body obtained through the post process is desirably used as a ceramic filter, and in the case where the plugging material paste is not filled in cells, for example, the honeycomb structured body obtained through the post process is desirably used as a catalyst supporting carrier.

(4) Next, degreasing (for example, at a temperature of at least about 200° C. and at most about 600° C.) and firing (for example, at a temperature of at least about 1400° C. and at most about 2300° C.) are carried out on the honey comb molded body filled in with the plugging material paste under predetermined conditions so that a honeycomb fired body (see FIGS. 7A and 7B), the entire portion of which is formed by a single fired body and in which a plurality of cells, each penetrating in the longitudinal direction, are placed in parallel with one another with a cell wall therebetween, with either one of the ends of each cell being plugged, is manufactured.

With respect to the degreasing conditions and firing conditions of the honeycomb molded body, conventionally used conditions used upon manufacturing a filter made of a porous ceramic material may be adopted.

(5) Next, a gap holding member, which forms a spacer, is bonded to a side face of the honeycomb fired body, if necessary, and at the same time, a sealing material paste, which forms a sealing material layer (adhesive layer) is applied thereto with a uniform thickness so that a sealing material paste layer is formed, and a process for successively laminating another honeycomb fired body on the sealing material paste layer is repeated so that an aggregate of honeycomb fired bodies having a predetermined size is manufactured.

Here, in the method for manufacturing a honeycomb structured body according to the embodiments of the present invention, after a required number of honeycomb fired bodies have been assembled through the gap holding members, the sealing material paste may be filled in the mutual gaps among the honeycomb fired bodies at one time.

Examples of the above-mentioned sealing material paste include a material comprising an inorganic fiber and/or an inorganic particle in addition to an inorganic binder and an organic binder, for instance.

Examples of the above-mentioned inorganic binder include silica sol, alumina sol and the like, for instance. It is also acceptable to use the above alone or in combination. Among the above-mentioned inorganic binders, silica sol is preferable.

Examples of the above-mentioned organic binder include polyvinyl alcohol, methyl cellulose, ethyl cellulose, carboxymethyl cellulose and the like, for instance. It is also acceptable to use the above alone or in combination. Among the above-mentioned organic binders, carboxymethyl cellulose is preferable.

Examples of the above-mentioned inorganic fiber include a ceramic fiber or the like such as silica-alumina, mullite, alumina, silica and the like for instance. It is also acceptable to use the above alone or in combination. Among the above-mentioned inorganic fibers, alumina fiber is preferable.

Examples of the above-mentioned inorganic particle include carbide, nitride and the like, for instance. More concrete examples include inorganic powders comprising silicon carbide, silicon nitride, or boron nitride. It is also acceptable to use the above alone or in combination. Among the above-mentioned inorganic particle, silicon carbide, excellent in thermal conductivity, is preferable.

Moreover, it is acceptable to add balloons, which are micro-sized hollow spherical bodies containing oxide ceramic as component, and pore-forming agent such as a spherical acrylic particle or graphite to the above-mentioned sealing material paste, if necessary.

The above-mentioned balloon is not particularly limited, and examples thereof may include alumina balloon, glass micro balloon, shirasu balloon, fly ash balloon (FA balloon), mullite balloon and the like. Among these, alumina balloon is preferable.

(6) Next, this aggregate of honeycomb fired bodies is heated so that the sealing material paste layers are dried and solidified to form sealing material layers (adhesive layers).

Next, the aggregate of honeycomb fired bodies in which a plurality of honeycomb fired bodies have been bonded to one another through sealing material layers (adhesive material layers) is subjected to a cutting process by using a diamond cutter or the like so that a cylindrical honeycomb block is manufactured.

Here, in the present specification, the shape of the ceramic block to be manufactured by this manufacturing method is not limited to a round pillar, and may be any desired shape of a pillar including an oval pillar, a polygonal pillar and the like.

Then, a sealing material layer (coat layer) is formed on the outer periphery of the honeycomb block by using the above-mentioned sealing material paste. By carrying out these processes, a honeycomb structured body (see FIG. 6), in which a sealing material layer (coat layer) is formed on the outer periphery of a cylindrical ceramic block formed by a plurality of honeycomb fired bodies that are bonded to one another through sealing material layers (adhesive layers), can be manufactured.

In the method for manufacturing a honeycomb structured body according to the embodiments of the present invention, a catalyst may be supported on the honeycomb structured body, if necessary.

The supporting process of the catalyst may be carried out on the honeycomb fired bodies prior to being formed into an aggregate.

In a case of supporting the catalyst, it is preferable to form an alumina film of a high specific surface area on the surface of the honeycomb structured body, and then supply a co-catalyst or a catalyst such as platinum or the like onto the surface of this alumina film.

Examples of methods for forming the alumina film onto the surface of the above-mentioned honeycomb structured body include a method of impregnating the honeycomb structured body with a solution of a metallic compound containing an aluminum such as Al $(NO_3)_3$ and then heating, a method of impregnating the honeycomb structured body with a solution containing an aluminum powder and then heating, and the like, for instance.

Examples of methods for supplying the co-catalyst to the above-mentioned alumina film include a method of impregnating the honeycomb structured body with a metallic compound solution containing rare earth elements or the like such as Ce $(NO_3)$ 3 and then heating, and the like, for instance.

Examples of methods for supplying the catalyst to the above-mentioned alumina film include a method of impregnating the honeycomb structured body with a nitric acid solution of diammine dinitro platinum ([Pt $(NH_3)_2(NO_2)_2$]$HNO_3$ platinum concentration: about 4.53% by weight) and the like and then heating, and the like, for instance.

It is also acceptable to supply the catalyst according to a method of supplying a catalyst to alumina particle in advance, and impregnating the honeycomb structured body with a solution containing the alumina powder that has been given the catalyst, and then heating, and the like.

Although, the embodiments of the honeycomb structured body manufactured by the method for manufacturing a honeycomb structured body described above is a honeycomb structured body having a form that a plurality of honeycomb fired bodies are combined with one another by interposing a sealing material layer (adhesive layer) (hereinafter termed "aggregated honeycomb structured body"), the honeycomb structured body manufactured by the method for manufacturing according to the embodiments of the present invention may also be a honeycomb structured body in which a cylindrical ceramic block is constituted by a single piece of a honeycomb fired body (hereinafter termed "integral honeycomb structured body").

In a case of manufacturing such an integral honeycomb structured body, the honeycomb molded body is manufactured using the same methods used in the manufacture of the aggregated honeycomb structured body, except that the size of the honeycomb molded body molded by extrusion molding is larger than the size of the honeycomb molded body in the manufacture of the aggregated honeycomb structured body.

Here, since methods for mixing material powders and the like are the same as those methods used for manufacturing the aggregated honeycomb structured body, the description thereof will be omitted.

Next, in the same manner as the manufacturing processes of the aggregated honeycomb structured body, the honeycomb molded body is dried by using a drying apparatus, such as a microwave drying apparatus, a hot-air drying apparatus, a dielectric drying apparatus, a reduced-pressure drying apparatus, a vacuum drying apparatus and a freeze drying apparatus. Next, a predetermined amount of plug material paste, which forms plugs, is filled into the end portion at the outlet side of the inlet-side group of cells and the end portion at the inlet side of the outlet-side group of cells so that the cells are sealed.

Thereafter, degreasing, firing and adhesive-deposit removing processes are carried out in the same manner as the manufacturing processes of the aggregated honeycomb structured body so that a ceramic block is manufactured, and by forming a sealing material layer (coat layer) thereon, if necessary, an integral honeycomb structured body is manufactured. Here, the sealing material layer may be more easily formed by carrying out the aforementioned adhesive-deposit removing process.

Moreover, a catalyst may be supported on the integral honeycomb structured body as well, by using the above-mentioned method.

In the case where a honeycomb structured body is manufactured according to the embodiments of the manufacturing method as mentioned above, upon manufacturing the aggregated honeycomb structured body, silicon carbide, and metal silicon combined with silicon carbide are desirably used as the main component of the materials, and upon manufacturing the integral honeycomb structured body, cordierite and aluminum titanate are desirably used as the main component thereof.

Moreover, the foregoing explanation has been given mainly on a honeycomb structured body which is a honeycomb filter (ceramic filter) used for capturing particulates in exhaust gases; however, the honeycomb structured body may also be desirably used as a catalyst supporting carrier (honeycomb catalyst) that converts exhaust gases.

The contents of JIS Z 2244 and JIS B 0601 are incorporated herein by reference in its entirety.

EXAMPLES

The following description will discuss the present invention in more detail by means of examples; however, the present invention is not intended to be limited only to these examples.

Example 1

Powder of α-type silicon carbide having an average particle diameter of 10 μm (250 kg), powder of α-type silicon carbide having an average particle diameter of 0.5 μm (100 kg) and an organic binder (methylcellulose) (20 kg) were mixed to prepare mixed powder.

Next, separately, a lubricant (UNILUB, manufactured by NOF Corp.) (12 kg), a plasticizer (glycerin) (5.6 kg) and water (64 kg) were mixed to prepare a liquid mixture, and this liquid mixture and the mixed powder were mixed by using a wet mixer so that a wet mixture was prepared. At this time, the moisture content of the met mixture was 14% by weight.

Next, using an extrusion-molding machine equipped with two-stage screw mixers shown in FIG. 1, the wet mixture was continuously charged into the extrusion-molding machine through a charging hopper 31 for extrusion molding so that an elongated body of the honeycomb molded body was formed, and this was cut into pieces having a length of 25 cm, and then dried by a drying apparatus using microwaves and hot air in combination to remove almost all the moisture (the moisture content was reduced by almost 100%) so that honeycomb molded bodies were manufactured. In the extrusion-molding machine 20, with respect to the blade portion forming the upper stage screw 53 and the lower stage screw 63, a blade on which a high-hardness coat layer (tungsten carbide film) that had a thickness of 800 μm and was mainly composed of tungsten carbide with the initial surface roughness Ra of 0.6 μm was formed was used.

The surface roughness Ra was adjusted by buff polishing. Here, the surface roughness Ra was measured by using a contact-type surface roughness measuring instrument (Surfcom 804A, made by Tokyo Seimitsu Co., Ltd.).

Moreover, the inner pressure of the extrusion-molding machine was made lower than the atmospheric pressure by 65 kPa.

The tungsten carbide film was formed by first flame spray coating a self-melting alloy to form a film, and then carrying out buff polishing thereon so as to provide the above-mentioned surface roughness. In other words, after mixing tungsten carbide and nickel using Ni (nickel) as a binder, flame spray coating and then heating and depositing of the mixture was carried out to form a tungsten carbide film, and then buff polishing was carried out on the tungsten carbide film.

(Shape Evaluation on Honeycomb Molded Body)

The honeycomb molded bodies thus manufactured were visually observed mainly on the shape of the cells so that evaluation was made as to whether or not a desired shape was obtained without any partial cut or the like in the cell, and the amount of warping of the honeycomb molded body was also measured. Thus, those honeycomb molded bodies which had no cell cut and an amount of warping of 0.5 mm or less were evaluated as good products. The results are as shown in Table 1.

Here, the amount of warping was measured by using a warping amount measuring jig.

The warping amount measuring jig used here had a structure in which a straight rectangular member having almost the same length as the overall length of the molded body was provided with contact members having the same thickness attached to both the two ends of the rectangular member, and also provided with a scale capable of sliding perpendicularly to the longitudinal direction of the rectangular member on the center of this rectangular member. Moreover, upon measuring, the contact members were made in contact with the two ends of the molded body, and the warping amount measuring scale was then shifted toward the molded body side; thus, the amount of shift of the scale when the scale was made in contact with the molded body was read so that the warping amount was measured.

(Measurement of Amount of Abrasion of High-Hardness Coat Layer)

The extrusion-molding machine was disassembled after driven continuously for 4000 hours, and the tungsten carbide film was visually observed for any abrasion.

Examples 2 and 3, Reference Example 1

The same processes as those of Example 1 were carried out except that the thickness of the high-hardness coat layer of the molding machine was changed to each of values shown in Table 1 so that a honeycomb molded body was manufactured.

In the same manner as Example 1, the shape of the honeycomb molded body was evaluated and the amount of abrasion of the high-hardness coat layer was measured. The results are as shown in Table 1.

Reference Example 2

The same processes as those of Example 1 were carried out except that the pressure inside the molding machine was set to (the atmospheric pressure—40 kPa) so that a honeycomb molded body was manufactured.

In the same manner as Example 1, the shape of the honeycomb molded body was evaluated and the amount of abrasion of the high-hardness coat layer was measured. The results are as shown in Table 1.

Reference Examples 3 and 4

The same processes as those of Example 1 were carried out except that the amount of water to be used upon preparing the liquid mixture was changed to each of values shown below so that a honeycomb molded body was manufactured. That is, in Reference Example 3, the amount of water was set to 34 kg, and in Reference Example 4, the amount of water was set to 130 kg.

In the same manner as Example 1, the shape of the honeycomb molded body was evaluated and the amount of abrasion of the high-hardness coat layer was measured. The results are as shown in Table 1.

Reference Example 5

The same processes as those of Example 1 were carried out except that the thickness of the high-hardness coat layer was changed to a value shown in Table 1; thus, an attempt was made to manufacture a honeycomb structured body. However, in the present Reference Example, since cracks occurred in the high-hardness coat layer upon forming the high-hardness coat layer, no honeycomb molded body was manufactured.

Comparative Example 1

The same processes as those of Example 1 were carried out except that no high-hardness coat layer was formed so that a honeycomb molded body was manufactured.

In the same manner as Example 1, the shape of the honeycomb molded body was evaluated and the amount of abrasion of the high-hardness coat layer was measured. The results are as shown in Table 1.

Here, in the present Comparative Example, surface roughness Ra means the surface roughness Ra of the blade portion main body.

TABLE 1

| | Thickness of high-hardness coat layer (μm) | Initial surface roughness Ra (μm) | Buff polishing | Inner pressure of space | Moisture content of wet mixture (weight %) | Shape of honeycomb molded body | Amount of abrasion of high-hardness coat layer |
|---|---|---|---|---|---|---|---|
| Example 1 | 800 | 0.6 | Yes | Atmospheric pressure - 65 kPa | 14 | Good | Less than 400 μm |
| Example 2 | 400 | 0.6 | Yes | Atmospheric pressure - 65 kPa | 14 | Good | Less than 400 μm |
| Example 3 | 1100 | 0.6 | Yes | Atmospheric pressure - 65 kPa | 14 | Good | Less than 400 μm |
| Reference Example 1 | 100 | 0.6 | Yes | Atmospheric pressure - 65 kPa | 14 | Good | 600 μm or more to less than 1000 μm |
| Reference Example 2 | 800 | 0.6 | Yes | Atmospheric pressure - 40 kPa | 14 | Occurrence of some cell cuts | — |
| Reference Example 3 | 800 | 0.6 | Yes | Atmospheric pressure - 65 kPa | 8 | Occurrence of some cell cuts | — |
| Reference Example 4 | 800 | 0.6 | Yes | Atmospheric pressure - 65 kPa | 25 | Occurrence of warping | — |

TABLE 1-continued

| | Thickness of high-hardness coat layer (μm) | Initial surface roughness Ra (μm) | Buff polishing | Inner pressure of space | Moisture content of wet mixture (weight %) | Shape of honeycomb molded body | Amount of abrasion of high-hardness coat layer |
|---|---|---|---|---|---|---|---|
| Reference Example 5 | 1500 | 0.6 | Yes | — | — | — | Occurrence of cracks (*) |
| Comparative Example 1 | No | 0.6 | Yes | Atmospheric pressure - 65 kPa | 14 | Good | 1500 μm or more |

(*) No honeycomb molded body was manufactured since cracks occurred in a high-hardness coat layer upon forming the high-hardness coat layer.

As clearly indicated by the results shown in Table 1, each of the honeycomb molded bodies manufactured in Examples had a good shape, and the amount of abrasion of the high-hardness coat layer was less than 400 μm, which was a low level.

In contrast, in each of Reference Example 1 and Comparative Example 1, the amount of abrasion of the high-hardness coat layer was high. Presumably, this is either because the thickness of the high-hardness coat layer was small or because no high-hardness coat layer was formed.

In the honeycomb molded bodies manufactured in Reference Examples 2 and 3, cell cuts were observed in some cells.

This problem occurred presumably because, with respect to Reference Example 2, bubbles were entrained in the wet mixture due to the use of a molding machine having a high inner pressure of (atmospheric pressure—40 kPa) upon molding the honeycomb molded body, and with respect to Reference Example 3, presumably because the moisture content of the wet mixture was low.

Moreover, in the honeycomb molded body manufactured in Reference Example 4, a large warping exceeding 0.5 mm occurred. Presumably, this problem was caused because the moisture content in the wet mixture was high.

Furthermore, in the honeycomb molded body manufactured in Reference Example 5, cracks occurred in a high-hardness coat layer upon forming the high-hardness coat layer. Presumably, this problem was caused because the thickness of the high-hardness coat layer was large.

Examples 4 to 9, Reference Example 6

The same processes as those of Example 1 were carried out except that the initial surface roughness Ra of the high-hardness coat layer formed on the surface of each screw was set to each of values shown in Table 2 so that a honeycomb structured body was manufactured.

In this case, the extruding efficiency of the extrusion-molding machine was evaluated by the following method.

First, the rotation speed of the lower-stage screw 63 was set to 10 rotations/min, and the extruding speed of the molded body per unit time was measured so that the volume of the molding material to be extruded was calculated. Next, based upon the pitch (interval) of the blades of the screw, the diameter of the pitch circle (circle made by the tip of the blade portion) and the number of rotations in accordance with the unit time, an optimal extrusion volume of the molding material was calculated. Thus, the value obtained by dividing the actually measured extrusion volume by the optimal extrusion volume was defined as an extrusion efficiency (%).

Figure 8:
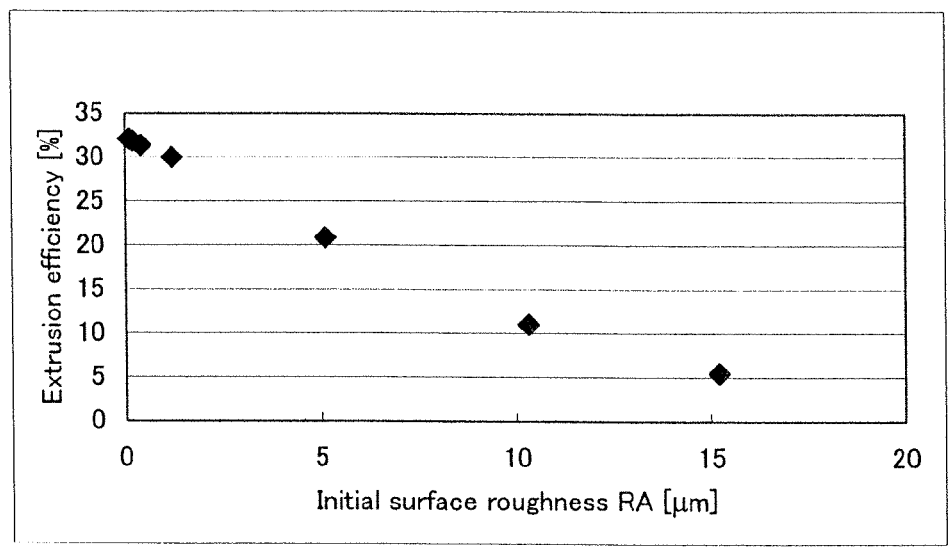
FIG. 8 is a graph showing a relationship between the initial surface roughness Ra (μm) of the high-hardness coat layer and the extrusion efficiency (%).

The results are as shown in Table 2 and FIG. 8. FIG. 8 is a graph showing a relationship between the initial surface roughness Ra (μm) of the high-hardness coat layer and the extrusion efficiency (%).

TABLE 2

| | Initial surface roughness Ra (μm) | Buff polishing | Extrusion efficiency (%) |
|---|---|---|---|
| Example 4 | 0.1 | Yes | 32.1 |
| Example 5 | 0.2 | Yes | 31.9 |
| Example 6 | 0.4 | Yes | 31.4 |
| Example 7 | 1.2 | Yes | 30.0 |
| Example 8 | 5.1 | Yes | 20.9 |
| Example 9 | 10.3 | Yes | 11.0 |
| Reference Example 6 | 15.2 | Yes | 5.5 |

As clearly indicated by the results shown in Table 2 and FIG. 8, when the surface roughness Ra of the high-hardness coat layer is 10 μm or less, it is possible to ensure an extrusion efficiency of about 11% or more; in contrast, when the surface roughness Ra of the high-hardness coat layer exceeds 10 μto cause a rough surface, the extrusion efficiency is lowered greatly.

In particular, when the surface roughness Ra of the high-hardness coat layer is as small as 5 μor less, it is possible to ensure an extrusion efficiency of about 21% or more, leading to a superior working efficiency.

Examples 10 to 12, Reference Example 7

The same processes as those of Example 1 were carried out except that the initial surface roughness Ra of the high-hardness coat layer formed on the surface of each screw and the porosity of the high-hardness coat layer were set to values as shown in Table 3 so that honeycomb molded bodies were manufactured. Here, the porosity of the high-hardness coat layer was adjusted by changing phasing conditions after the flame spray coating. In this case, the phasing means a process of re-fusing the coat-layer after the flame spray coating.

In this case, after the extrusion-molding machine had been driven continuously for 4000 hours, the surface roughness Ra of the high-hardness coat layer was measured, and the maximum dimension of recess portions formed on the surface of the high-hardness coat layer was measured.

Here, with respect to the maximum dimension of the recess portions, an image of the surface of the high-hardness coat layer was captured through an electron microscope, and the maximum dimension was calculated based upon this image.

Reference Example 8

The same processes as those of Example 1 were carried out except that a tungsten carbide film was formed through the following method so that a honeycomb structured body was manufactured.

Upon forming the tungsten carbide film, after mixing tungsten carbide and nickel using Co (Cobalt) as a binder, flame spray coating and then heating and depositing of the mixture was carried out to form a tungsten carbide film, and then buff polishing was carried out on the tungsten carbide film.

In the present Reference Example, after the extrusion-molding machine had been driven continuously for 4000 hours in the same manner as Example 10, the surface roughness Ra of the high-hardness coat layer was measured, and the maximum dimension of recess portions formed on the surface of the high-hardness coat layer was measured.

Figure 9A:
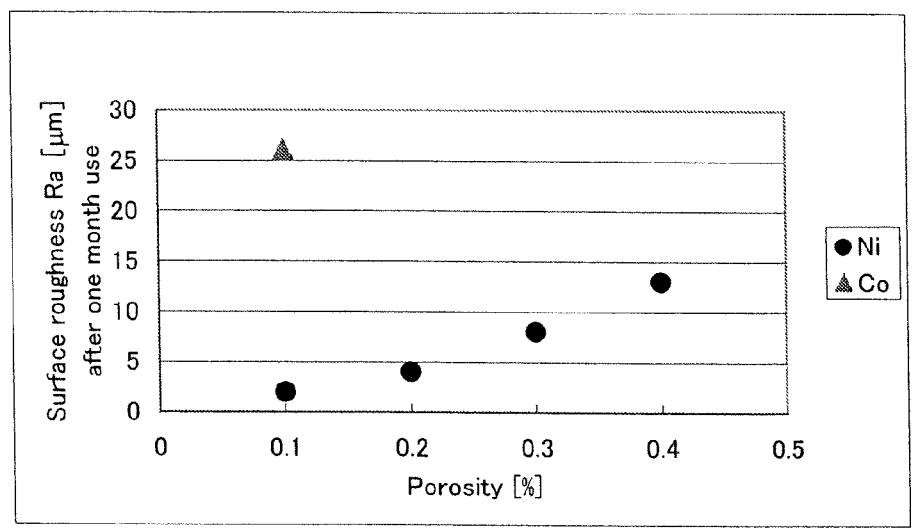
FIG. 9A is a graph showing a relationship between the porosity (%) of the high-hardness coat layer and the surface roughness Ra (μm) of the high-hardness coat layer after one month use.
Figure 9B:
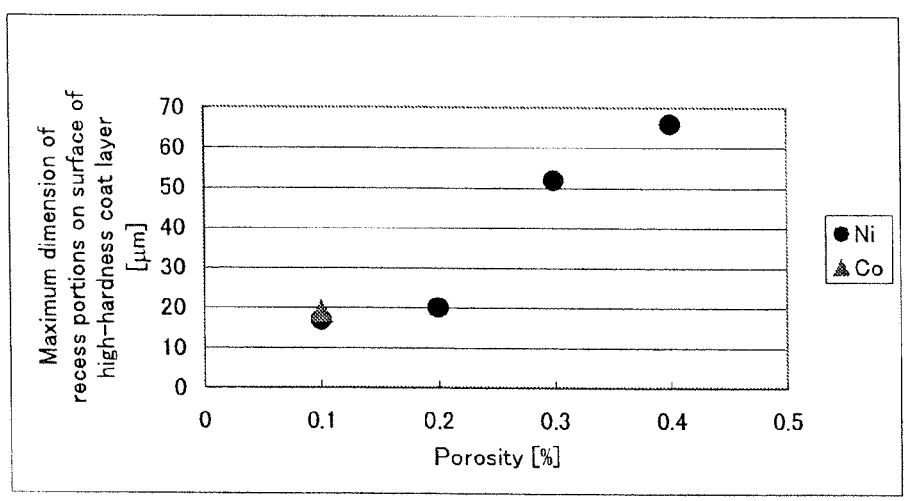
FIG. 9B is a graph showing a relationship between the porosity (%) of the high-hardness coat layer and the maximum dimension (μm) of recess portions formed on the surface of the high-hardness coat layer.
Figure 9C:
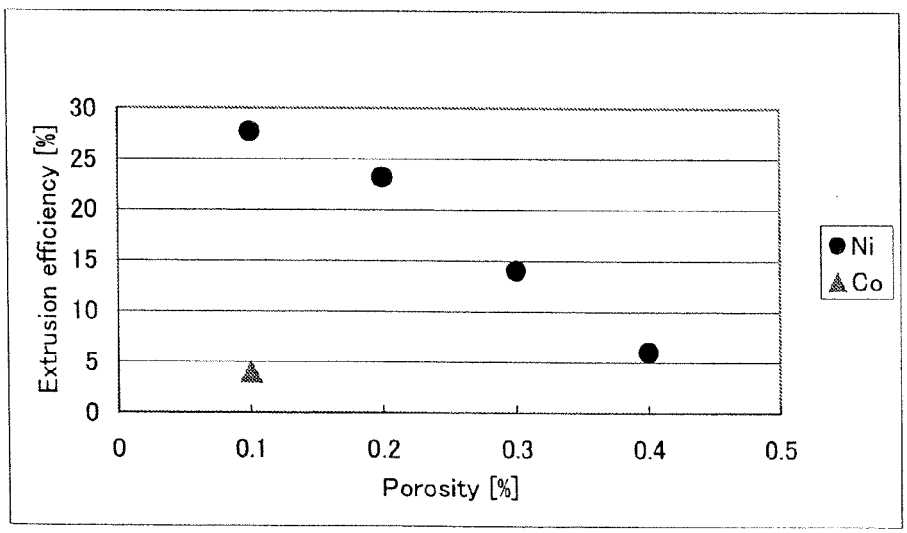
FIG. 9C is a graph showing a relationship between the porosity (%) of the high-hardness coat layer and the extrusion efficiency (%).

The measurement results of Examples 10 to 12, and Reference Examples 7 and 8 are as shown in Table 3 and FIGS. 9A, 9B and 9C. FIG. 9A is a graph showing a relationship between the porosity (%) of the high-hardness coat layer and the surface roughness Ra (μm) of the high-hardness coat layer after one month use, FIG. 9B is a graph showing a relationship between the porosity (%) of the high-hardness coat layer and the maximum dimension (μm) of recess portions formed on the surface of the high-hardness coat layer, and FIG. 9C is a graph showing a relationship between the porosity (%) of the high-hardness coat layer and the extrusion efficiency (%).

TABLE 3

| | Binder of high-hardness coat layer | Initial surface roughness Ra (μm) | Buff polishing | Porosity (%) | Surface roughness Ra (μm) after one month use | Maximum dimension of recess portions on surface of high-hardness coat layer (μm) | Extrusion efficiency (%) |
|---|---|---|---|---|---|---|---|
| Example 10 | Ni | 0.6 | Yes | 0.1 | 2.1 | 17 | 27.7 |
| Example 11 | Ni | 0.5 | Yes | 0.2 | 4.3 | 20 | 23.2 |
| Example 12 | Ni | 0.6 | Yes | 0.3 | 8.2 | 52 | 14.0 |
| Reference Example 7 | Ni | 0.7 | Yes | 0.4 | 13.2 | 66 | 6.0 |
| Reference Example 8 | Co | 0.6 | Yes | 0.1 | 26.6 | 19 | 4.0 |

As clearly indicated by the results of Examples 10 to 12, Reference Examples 7 and 8 shown in Table 3 and FIGS. 9A, 9B, 9C, in the case where the porosity of the high-hardness coat layer is less than 0.3%, even after having been continuously driven for 4000 hours, a surface roughness Ra of 10 μm or less, which ensures a sufficient extrusion efficiency, can be maintained, and the maximum dimension of recess portions formed on the surface of the high-hardness coat layer tends to be as small as 50 μm or less.

In contrast, as shown in Reference Example 7, when the porosity of the high-hardness coat layer is more than 0.3%, the surface roughness Ra becomes higher. Moreover, when the surface roughness Ra is more than 10 μm, the extrusion efficiency is reduced greatly as has already been shown in Reference Example 6. The reason for an increase in the surface roughness Ra in the case of the porosity exceeding 0.3% in this manner is because the particle diameter of particles forming the tungsten carbide film tends to become large, and this tendency is also clearly indicated by the fact that the maximum dimension of recess portions on the surface of the high-hardness coat layer becomes more than 50 μm.

Moreover, as clearly indicated by the results of Reference Example 8, in the case where Co was used as the binder for the tungsten carbide film, the resulting surface roughness Ra after the continuous driving operation for 4000 hours became as high as 26 μm. This is presumably because, since the binder of the tungsten carbide film was Co, there was degradation in the corrosion resistant property in the tungsten carbide film, leading to a higher frequency of coming off of particles that form the tungsten carbide film. Upon observing the electron microscopic photograph used for calculating the maximum dimension of recess portions on the surface of the high-hardness coat layer, it was found that the number of recess portions formed was larger in comparison with that of Example 10.

What is claimed as new and desired to be secured by Letters Patent of the United States is:

1. A method for manufacturing a honeycomb structured body comprising:
obtaining a wet mixture containing inorganic powder by wet-mixing;
extrusion molding the wet mixture for molding thereof to manufacture a pillar-shaped honeycomb molded body having a number of cells, each penetrating in a longitudinal direction, placed in parallel with one another with a cell wall therebetween; and
firing said honeycomb molded body to manufacture a honeycomb structured body made of a honeycomb fired body,
wherein
said extrusion-molding is carried out using an extrusion-molding machine comprising a screw having a blade portion for extruding a molding material with a high-hardness coat layer formed at least on said blade portion, the high-hardness coat layer having a Vickers hardness of about 1000 HV or more measured based on JIS Z 2244, the screw disposed in a tightly-closed space, and a die disposed in a tip portion of said extrusion-molding machine, said tip portion of said extrusion-molding machine being a tip portion of said screw, by mixing said wet mixture that has a moisture content of at least about 10% by weight and at most about 20% by weight while maintaining said space in a reduced-pressure atmosphere that is lower than the atmospheric pressure by at least about 50 kPa and at most about 100 kPa, and at the same time continuously extruding said wet mixture through said die placed at the outlet of said space,
silicon carbide powder is used as said inorganic powder,
said high-hardness coat layer has a surface roughness Ra of about 10 μm or less,
said high-hardness coat layer has a porosity of about 0.3% or less,
a maximum dimension of recess portions on the surface of said high-hardness coat layer is at least about 1 μm and at most about 50 μm,
said extrusion-molding machine comprises two to four screw mixers each provided with said screw and said die,
said extrusion-molding machine comprises a plurality of the screws and the same number of the dies as said screws, and a wet mixture, which has been mixed by one of the screws and then continuously extruded through one of the dies, is again mixed by another screw and continuously extruded through another die, said screw mixers comprise an upper-stage screw mixer and a lower-stage screw mixer, an upper-stage die in which a number of through holes are formed is attached to a tip portion of said upper-stage screw mixer, a vacuum chamber is provided at a portion of said upper-stage die through which the wet mixture is extruded, and the inside thereof is maintained in a reduced-pressure state close to vacuum, said extrusion-molding machine comprises an upper-stage cutter, serving as a cutting member, which is placed inside said vacuum chamber near said upper-stage die, and a cutting edge of said upper-stage cutter is located inside said vacuum chamber so that said cutting edge is allowed to reciprocally move up and down near said upper-stage die so that the wet mixture that has been extruded in a stick shape or in a thick noodle shape from said upper-stage die is cut into fine lumps by said cutting member, and a number of small lumps thus cut fall into said lower-stage screw mixer located right below.

2. The method for manufacturing a honeycomb structured body according to claim 1, wherein the main component of said high-hardness coat layer comprises tungsten carbide.

3. The method for manufacturing a honeycomb structured body according to claim 2, wherein nickel is used as a binder for forming said high-hardness coat layer.

4. The method for manufacturing a honeycomb structured body according to claim 1, wherein said high-hardness coat layer has a thickness of at least about 300 μm and at most about 1200 μm.

5. The method for manufacturing a honeycomb structured body according to claim 1, wherein said high-hardness coat layer has a Vickers hardness of about 2000 HV or more.

6. The method for manufacturing a honeycomb structured body according to claim 1, wherein the period of time from charging of said wet mixture into said extrusion-molding machine till extrusion of the wet mixture is at least about 50 minutes and at most about 90 minutes.

7. The method for manufacturing a honeycomb structured body according to claim 1, wherein said honeycomb structured body comprises a plurality of said honeycomb fired bodies which are bonded to one another by interposing sealing material layers.

8. The method for manufacturing a honeycomb structured body according to claim 1, wherein said honeycomb structured body comprises a single piece of said honeycomb fired body.

9. The method for manufacturing a honeycomb structured body according to claim 1, wherein a predetermined cell of said honeycomb structured body is filled in with a sealing material paste so that the honeycomb structured body is used as a ceramic filter.

10. The method for manufacturing a honeycomb structured body according to claim 1, wherein no cells of said honeycomb structured body are filled in with a sealing material paste so that the honeycomb structured body is used as a catalyst supporting carrier.

11. The method for manufacturing a honeycomb structured body according to claim 1, wherein a speed at which the molded body is extruded is set to at least about 3500 mm/minute and at most about 4500 mm/minute.

* * * * *

UNITED STATES PATENT AND TRADEMARK OFFICE
CERTIFICATE OF CORRECTION

| | |
|---|---|
| PATENT NO. | : 8,124,002 B2 |
| APPLICATION NO. | : 11/696976 |
| DATED | : February 28, 2012 |
| INVENTOR(S) | : Norihiko Yamamura et al. |

It is certified that error appears in the above-identified patent and that said Letters Patent is hereby corrected as shown below:

Title page, item (30) should read as follows:

(30)    Foreign Application Priority Data

Apr. 13, 2006   (WO) ............ PCT/JP2006/307867

Signed and Sealed this
First Day of May, 2012

David J. Kappos
*Director of the United States Patent and Trademark Office*